US006043935A

United States Patent [19]

Lee

[11] Patent Number: 6,043,935

[45] Date of Patent: Mar. 28, 2000

[54] WAVELENGTH SENSITIVE BEAM COMBINER WITH ABERRATION CORRECTION

[75] Inventor: Wai-Hon Lee, Cupertino, Calif.

[73] Assignee: Hoetron, Inc., Sunnyvale, Calif.

[21] Appl. No.: 09/134,666

[22] Filed: Jul. 17, 1998

[51] Int. Cl.[7] .............................. G02B 5/18; G02B 27/44

[52] U.S. Cl. ............................ 359/566; 359/637; 359/16; 369/44.37; 369/112

[58] Field of Search ................................ 359/16, 17, 566, 359/569, 637; 369/44.37, 112, 58, 116

[56] References Cited

U.S. PATENT DOCUMENTS 5,754,512 5/1998 Komma .................................. 369/116
5,875,167 2/1999 Katayama ........................... 369/44.37

OTHER PUBLICATIONS

Wai–Hon Lee, "*Holographic grating scanners with aberration corrections,*" Applied Optics, vol. 16, No. 5, pp. 1392–1399, May 1977.

*Primary Examiner*—Cassandra Spyrou
*Assistant Examiner*—Leo Boutsikaris
*Attorney, Agent, or Firm*—Townsend and Townsend and Crew LLP

[57] ABSTRACT

A wavelength sensitive hologram which combines the 780 nm laser beam and the 650 nm laser beam to produce a compact DVD optical pickup. The 780 nm laser beam is incident on the hologram at an angle so that the first order diffraction from the hologram propagates along the optical axis of the hologram. The wavefront recorded on the hologram also contains aberration correction components so that the focused 780 nm laser beam on the CD substrate is nearly perfect or at least diffraction limited. The 650 nm laser beam is incident normal to the hologram plane so that the 0 order diffraction of the 650 nm laser beam remains propagating along the optical axis of the hologram.

12 Claims, 6 Drawing Sheets

WAVELENGTH SENSITIVE BEAM COMBINER WITH ABERRATION CORRECTION

BACKGROUND OF THE INVENTION

The present invention relates to optical heads used for CD or DVD players.

In recent years Digital Versatile Disc (DVD) or originally "Digital Video Disc" technology has been promoted as the next revolutionary consumer electronic product to replace the popular compact disc (CD) players. However, DVD players are not widely accepted and are only manufactured in relatively small quantities by major Japanese companies. One of the difficulties in manufacturing the DVD players is in designing an optical pickup which can read both the new DVD formatted discs and the old CD discs.

FIG. 1 illustrates this difficulty with the optical pickup design. A laser source 110 emits a beam of light which is reflected by a beamsplitter 130 to a collimating lens 140 and then focused by the objective lens 150 on the disc medium 160. Because the laser beam is focused through the medium substrate to its back surface 161 the objective lens is designed to correct for the spherical aberration induced by the substrate thickness. In another words, the medium substrate forms an integral part of the objective lens. The objective lens can not focus to a diffraction limited spot if a different thickness is used for the substrate.

The light reflected back by the back surface of the medium after passing through the two lenses is then focused on the detector 170 through the beamsplitter 130. The astigmatism created by the thickness of the beamsplitter in the returning beam is used to produce the focus error servo signal. In most CD players the optical pickup also contains a grating 120 to split the laser beam to produce three focused beams on the medium to provide the tracking error servo signal.

There is no difference in the optical principle for the optical pickup for CD players and DVD players. However, because the DVD format uses a track spacing of 0.84 μm and smaller pit size, the laser spot size required on the medium surface to read the data has to be smaller than 0.55 μm. As a result, a higher NA objective lens is used in the optical pickup for DVD players. With such a high NA objective lens, the diameter of the focused beam spot on the medium is sensitive to the tilting of the medium substrate. Hence, a thinner substrate is selected for the DVD disc. Referring back to the optical system in FIG. 1, a DVD optical pickup can be made by choosing a proper objective lens which is designed for the 0.6 mm substrate thickness for the DVD disc and a laser diode with 650 nm wavelength to achieve the spot size needed to read the data on the DVD disc. The following Table lists the differences between the DVD pickups and the CD pickups:

TABLE 1

| OBJECTIVE LENS | CD NA = 0.45 | DVD NA = 0.6 |
|---|---|---|
| SUBSTRATE THICKNESS | 1.2 mm | 0.6 mm |
| LASER WAVELENGTH | 780 nm | 635–650 nm |
| TRACK PITCH | 1.6 μm | 0.84 μm |

As can be seen in the Table above, there are three major differences between the CD system and the DVD system. The first one is the medium thickness. The DVD lens is designed to correct the spherical aberration caused by the 0.6 mm substrate. When a CD disc with its 1.2 mm thickness substrate is put in a DVD player with the DVD objective lens, the focused beam spot is severely aberrated.

The second difference is due to the difference in the track pitch between the DVD disc and the CD disc. A three beam method is commonly used in the CD optical pickup. This method requires the two outside beams to be separated by half of the track spacing. Since the CD disc has a track pitch of 1.6 μm and the DVD disc has a track pitch of 0.84 μm, the two outside beams for the three beam tracking can only be set for one disc type and not the other.

The third difference is the wavelength of the laser used for the CD pickup and the DVD pickup. This is caused by the dye used in the CD-R discs used by the CD recordable players. The particular dye used in most of the CD-R discs has a peak absorption at 650 nm. As a result, when a CD-R disc is inserted into a DVD player with only the 650 nm laser, most of the light incident on the medium is absorbed by the dye and little light is reflected back to the detector.

FIG. 2 shows one of the current DVD optical pickup designs which solves all three problems above. As shown, the laser beam emitted by a 780 nm laser diode 210 is combined with the laser beam emitted by a 650 nm laser diode 220 through the use of a beamsplitter 230. A three beam grating 290 is located in front of the laser 210. The remaining optical system is the same as in FIG. 1. Both beams can be individually reflected by a second beamsplitter 240. After passing through the collimating lens 250, the beams are focused by an objective lens 260 on a medium 270. The reflected beams are focused by the lenses 260 and 250 through the beamsplitter 240 to a detector 280. When a DVD disc is inserted into a player containing this optical pickup, the 650 nm laser diode 220 is turned on. However, when a CD disc is inserted, the 780 nm laser diode is turned on and the laser beam is focused on the surface 272. Since the objective lens 260 is designed for correcting for the substrate thickness of the DVD disc, the 780 nm beam on the medium will be aberrated. To minimize the aberration, an aperture 292 can be placed in front of the 780 nm laser diode 210 to limit the beam incident on the objective lens 260 to a smaller numerical aperture. It is also possible to implement a variable aperture or wavelength sensitive aperture 294 placed in front of the objective lens 260.

In FIG. 2 a three beam grating 290 is shown in front of the 780 nm laser diode 210. Therefore, in CD mode of operation, the three beam tracking method can be used. In the DVD mode of operation a single beam tracking method is commonly used. However, in this design a three beam grating 296 can be placed in front of the 650 nm laser diode 220 so that three beam tracking can also be implemented for the DVD mode of operation. There are two difficulties with this design. The major one is the uncorrected aberration in the 780 nm beam due to the substrate thickness. The second is the efficiency of the beamsplitter 230. Unless the beamsplitter 230 is an expensive polarization beamsplitter, half of the light emitted by either laser diode 210, or 220, is lost.

SUMMARY OF THE INVENTION

This patent application describes a wavelength sensitive hologram which combines the 780 nm laser beam and the 650 nm laser beam to produce a compact DVD optical pickup. The 780 nm laser beam is incident on the hologram at an angle so that the first order diffraction from the hologram propagates along the optical axis of the hologram. The wavefront recorded on the hologram also contains aberration correction components so that the focused 780 nm laser beam on the CD substrate is nearly perfect or with minimum aberration. The 650 nm laser beam is incident normal to the hologram plane so that the 0 order diffraction of the 650 nm laser beam remains propagating along the optical axis of the hologram.

The hologram is fabricated so that the first order diffraction efficiency at 780 nm and 0 order diffraction efficiency at 650 nm can both be optimized. Moreover, the aberration of the objective lens caused by the thicker substrate is corrected by the same hologram. This results in a low cost and high efficiency beamsplitter that can improve the prior art design as outlined in FIG. 2. In another embodiment of this invention, the beam combiner of this present invention can be used with the laser/detector devices of U.S. Patent Nos. 4,731,772, and 4,757,197 to further simplify the manufacturing of the optical pickups for the future DVD players.

In one embodiment, the DVD 635–650 nm laser is on the optical axis, while the CD 780 nm laser is off axis. The off axis laser will have less efficiency, and the CD laser can afford this because it does not have the high signal to noise requirement of the DVD laser. Also, the off axis CD laser is the one which can use the hologram to correct for the aberration due to a thicker disk substrate. This correction may widen the spot, and since the CD expects a wider spot, it is more appropriate to apply the aberration correction to the CD laser than the DVD laser.

DESCRIPTION OF THE PREFERRED EMBODIMENT

Figure 3:
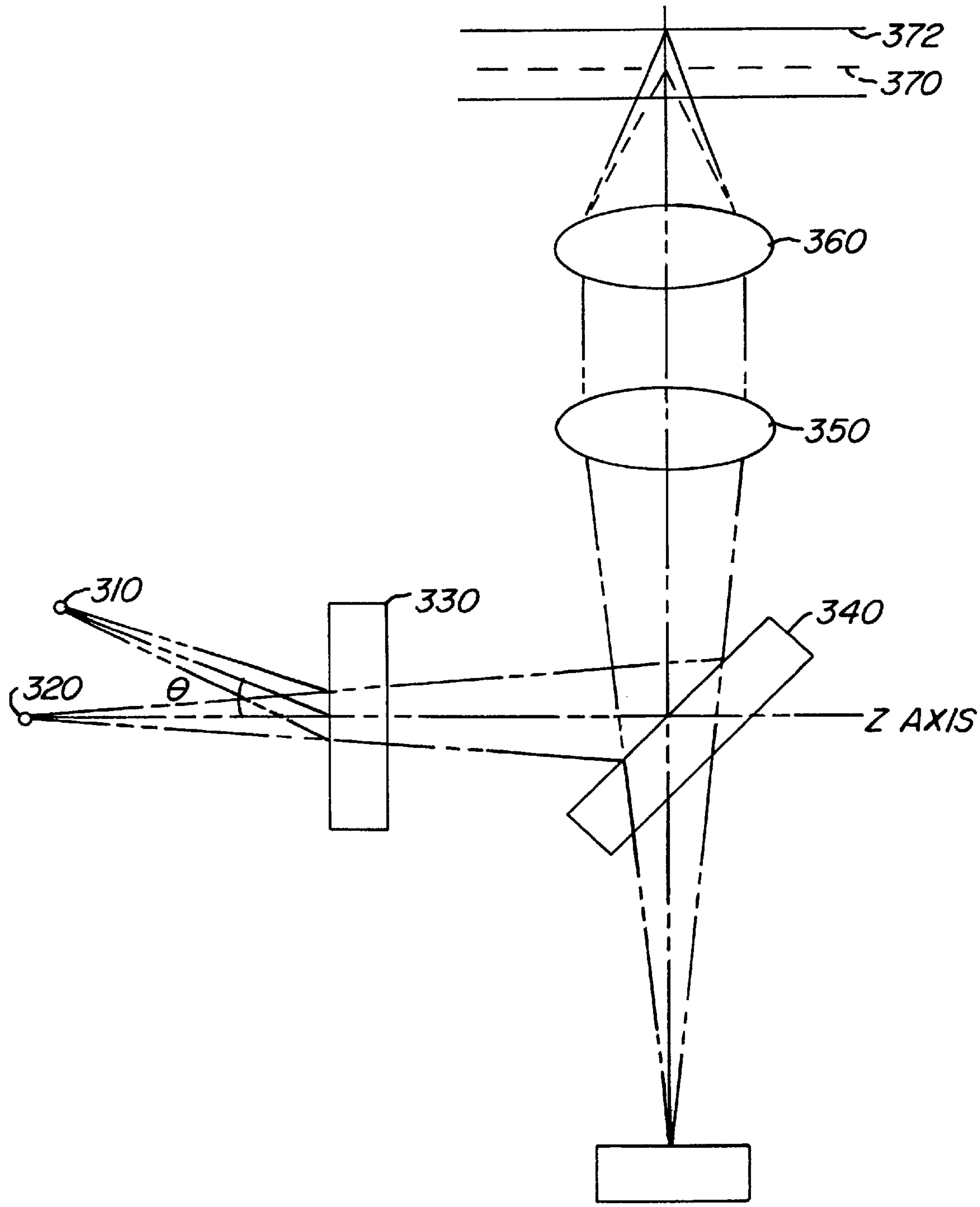
FIG. 3 is a diagram of a first embodiment of the DVD pickup of the present invention using a wavelength sensitive beam combiner.

FIG. 3 illustrates the optical principle of the present invention. A laser source 310 is shown projecting a laser a beam incident on a hologram 330 at an angle θ. The hologram can be generated by a computer with a wavefront $e^{j}\phi(x,y)$ where $$\phi(x, y) = \frac{J_2\pi}{\lambda}(\sin\theta x + \delta(x, y)).$$

The laser beam from source 310 is diffracted by the hologram resulting in a beam propagating along the hologram axis. The variables x and y are the spatial coordinates on the hologram plane. The optical axis of the hologram is along the z axis. The function δ(x,y) is the aberration correction term for the diffracted beam.

However, when another laser source 320 is incident on the hologram along the hologram axis, the 0 order diffraction from the hologram remains along the hologram axis. This is the basic principle of this beam combiner. Either laser beam after passing through the hologram 330 is reflected by a beamsplitter 340. A collimating lens 350 and an objective lens 360 focus the beam to the medium 370. The substrate thickness of the medium 370 is either 0.6 mm or 1.2 mm.

The objective lens 360 is designed to compensate for the aberration due to the 0.6 mm substrate thickness. The laser source 310 is intended for use with the 1.2 mm substrate medium. Since the hologram can affect the wavefront of its diffracted beams, the diffracted beam from source 310 is affected by the phase function δ(x,y) which is the aberration correction term for the 1.2 mm substrate. With this correction the laser beam from source 310 is properly focused to the surface 372 to an aberration free spot. Because the 0 order of the hologram is used for source 320, its wavefront is not affected by the phase function δ(x,y). In addition to this aberration correction for one laser source, while not affecting the second laser source, this hologram also has high light efficiencies for the two laser sources.

The article "High Efficiency Multiple Beam Gratings" by Wai-Hon Lee published in Applied Optics, volume 18, p.2152–2158, Jul. 1, 1979, described a relationship between the diffraction efficiency η and the wavelength λ:

$$\eta_0 = \cos^2\phi, \tag{2}$$

$$\eta_1 = \left(\frac{2}{\pi}\right)^2 \sin^2\phi_1, \tag{3}$$

where $\eta_0$ and $\eta_1$ are the diffraction efficiencies of the 0 order and the $1^{st}$ order respectively. The parameter ϕ is determined by the etched depth d and the refractive index n of the hologram substrate and is given by $$\pi(n-1)\frac{d}{\lambda}.$$

It is interesting to note that it is possible to choose the etched depth d so the $\eta_0$ and $\eta_1$ can be optimized for two different wavelengths. For example, the DVD optical pickups utilize a laser at 780 nm and a laser diode at 635 nm wavelengths. The following Table lists the etched depth which gives the optimum diffraction efficiencies.

TABLE 2

| Index n | Etched depth d | $\eta_0$ | $\eta_1$ |
|---|---|---|---|
| 1.5 | 2.5 μm | 94.3% | 36.5% |
| 1.6 | 2.1 μm | 96.3% | 37.5% |
| 1.7 | 1.8 μm | 96.3% | 35.4% |
| 1.8 | 1.55 μm | 91.8% | 37.4% |
| 1.9 | 1.4 μm | 96.3% | 35.4% |

Figure 1:
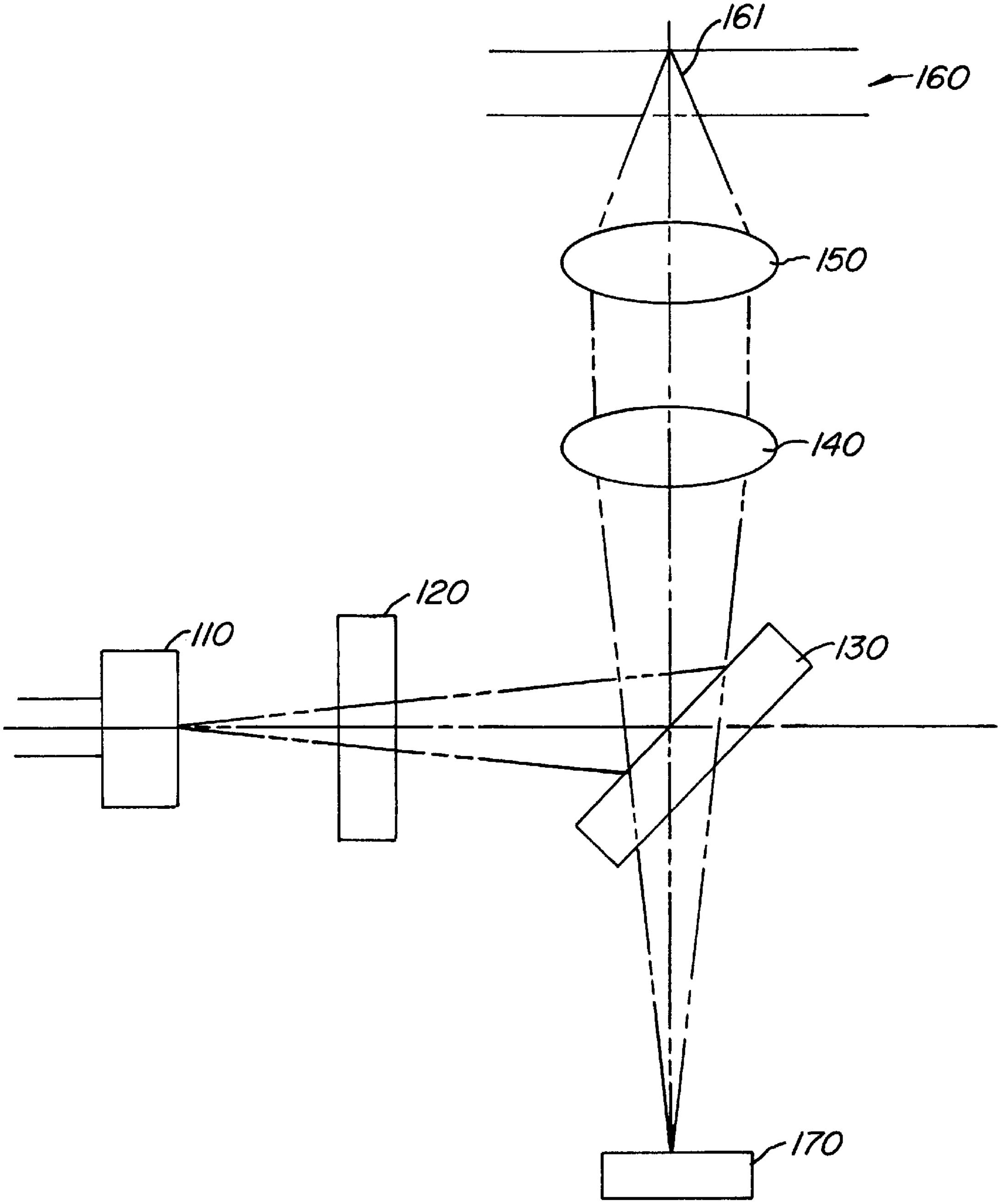
FIG. 1 is a diagram of a typical prior art optical system for a CD pickup.
Figure 2:
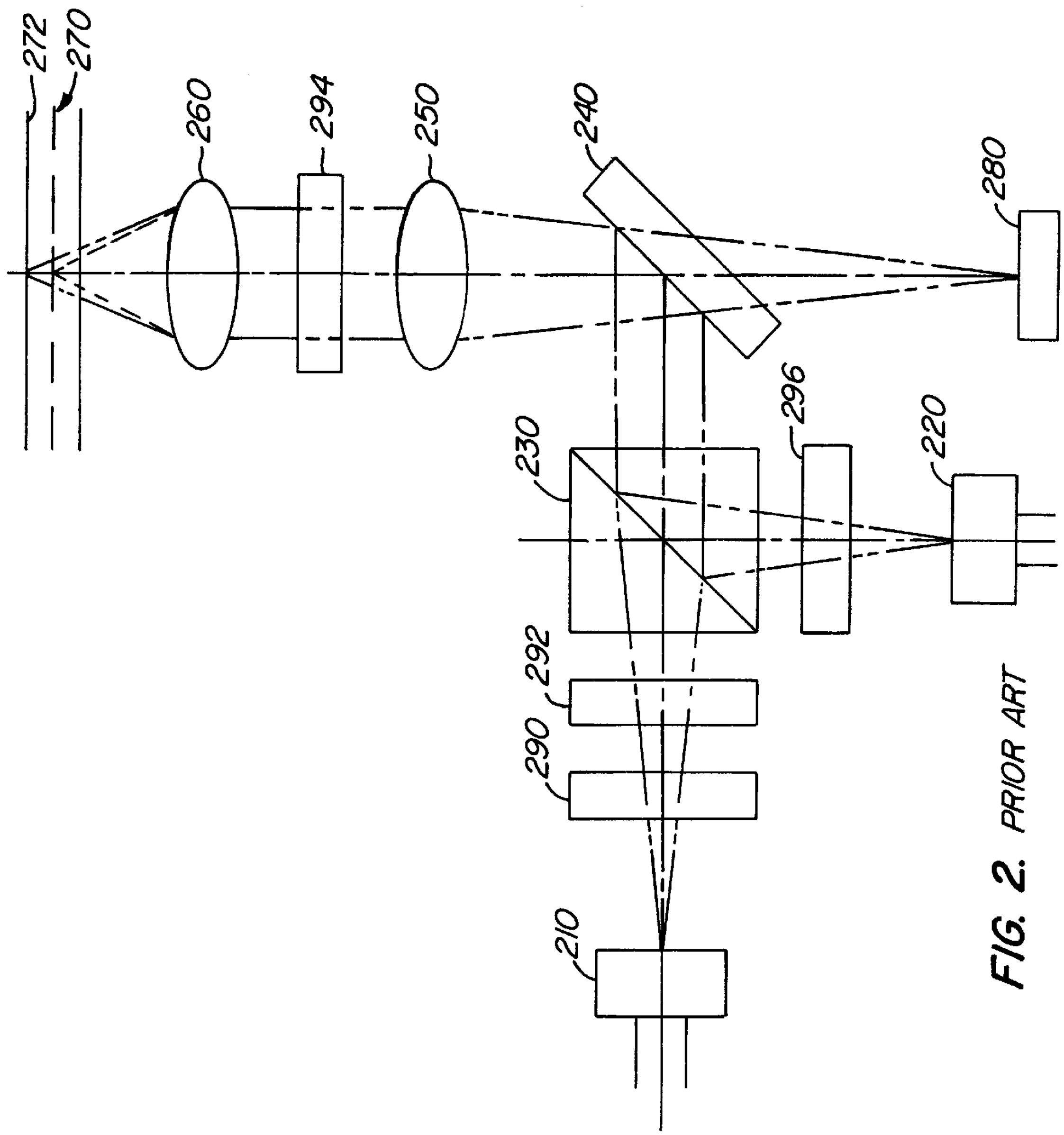
FIG. 2 is a diagram of a typical prior art optical system for a DVD pickup.

As can be seen, for the selected refractive index, $\eta_0$ is near its theoretical optimum efficiency of 100% and at the same time $\eta_1$ is near its theoretical optimum efficiency of 40.5%. For practical reasons it is easier to fabricate the hologram when the etched depth is shallower. For this reason a glass substrate with higher refractive index is preferred. In comparison to the prior art as shown in FIG. 2 the optimum reflection is 50% and optimum transmission is also 50%.

Figure 4:
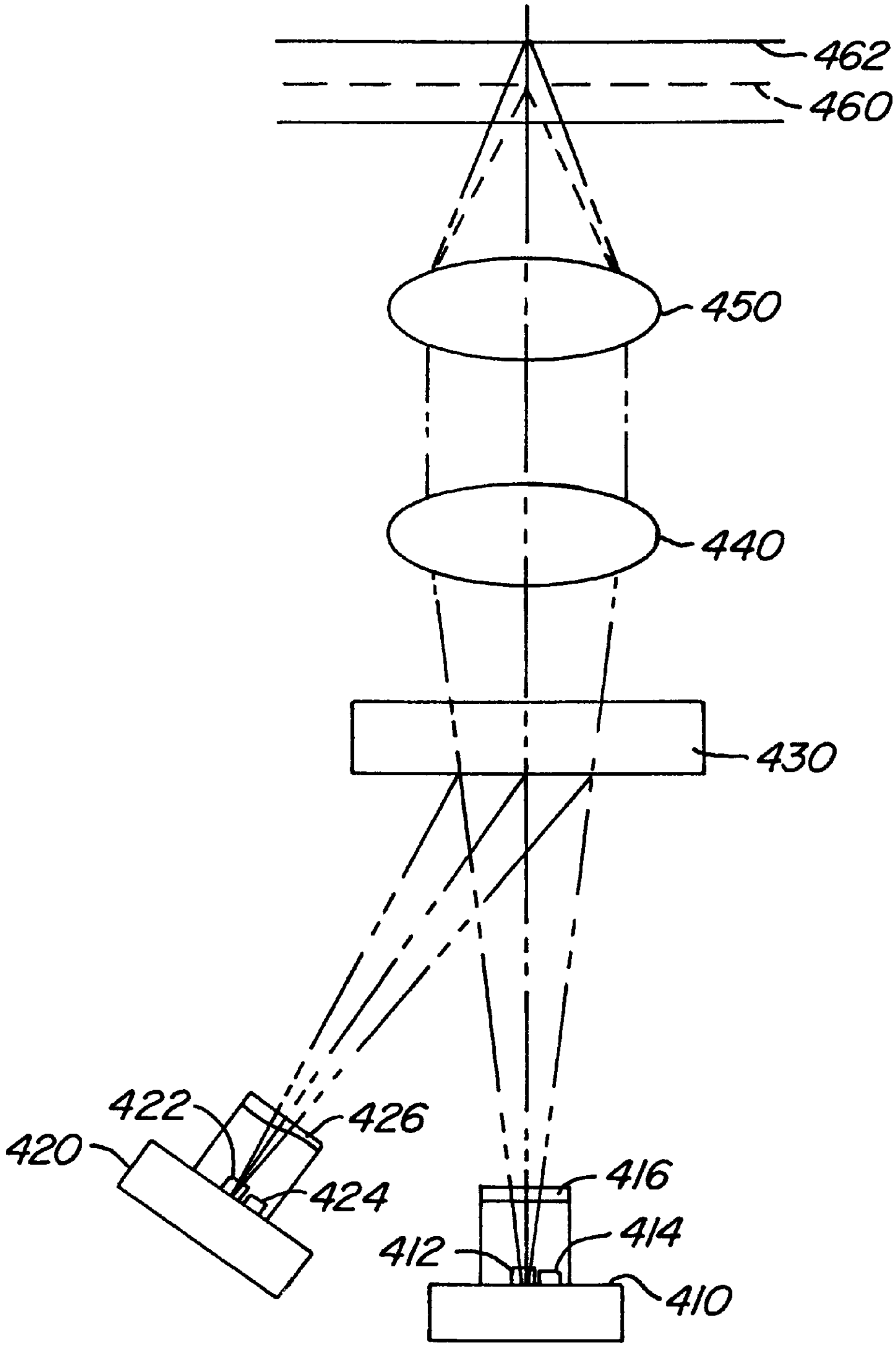
FIG. 4 is a diagram of another embodiment of the DVD pickup of the present invention using a wavelength sensitive beam combiner and laser/detector devices.

FIG. 4 shows a second embodiment of the present invention. The device 410 is a laser/detector/hologram device according to U.S. Pat. No. 4,757,197 and U.S. Pat. No. 4,731,772. The device 410 will contain a 650 nm laser 412, photodetector 414 and hologram device 416. The laser beam emitted by device 410 is incident on a hologram 430. The 0 order diffracted light from hologram 430 passes through the lenses 440 and 450 and is focused onto the medium 460 with substrate thickness of 0.6 mm. The light reflected by the medium will return to the device 410 through the 0 order diffraction of the hologram 430 and be detected by a photodetector inside the device 410. In a similar fashion the light beam emitted by the device 420 which had a 780 nm wavelength is diffracted by the hologram 430. Device 420 includes a laser 422, photodetector 424, and hologram device 426. The diffracted beam contains a phase variation correcting for the aberration produced by the change in medium thickness into 1.2 mm. This results in a diffraction limited spot on the surface 462 of the 1.2 mm substrate thickness. The returned beam from medium 462 is diffracted by the hologram 430 back to the device 420. The main difference between this embodiment and the previous one is that the returned beam from the medium also passes through hologram 430. This reduces the light efficiency significantly for device 420. For example, the hologram 430 has a 1st order diffraction efficiency of 35%. Passing through the hologram two times results in a total efficiency of about 10%. However, since the signal to noise ratio needed for reading the compact disc is significantly lower than the requirement for DVD discs, the lower light efficiency for the CD portion can be compensated for by using a higher amplifier gain. The unique advantage of the second embodiment is the simplicity in the construction of such an optical pickup for the DVD players with backward compatibility for reading the CD discs.

Even though we use 650 nm and 780 nm wavelengths as examples, the same concept is equally applicable to other combination of laser wavelengths.

Figure 5A:
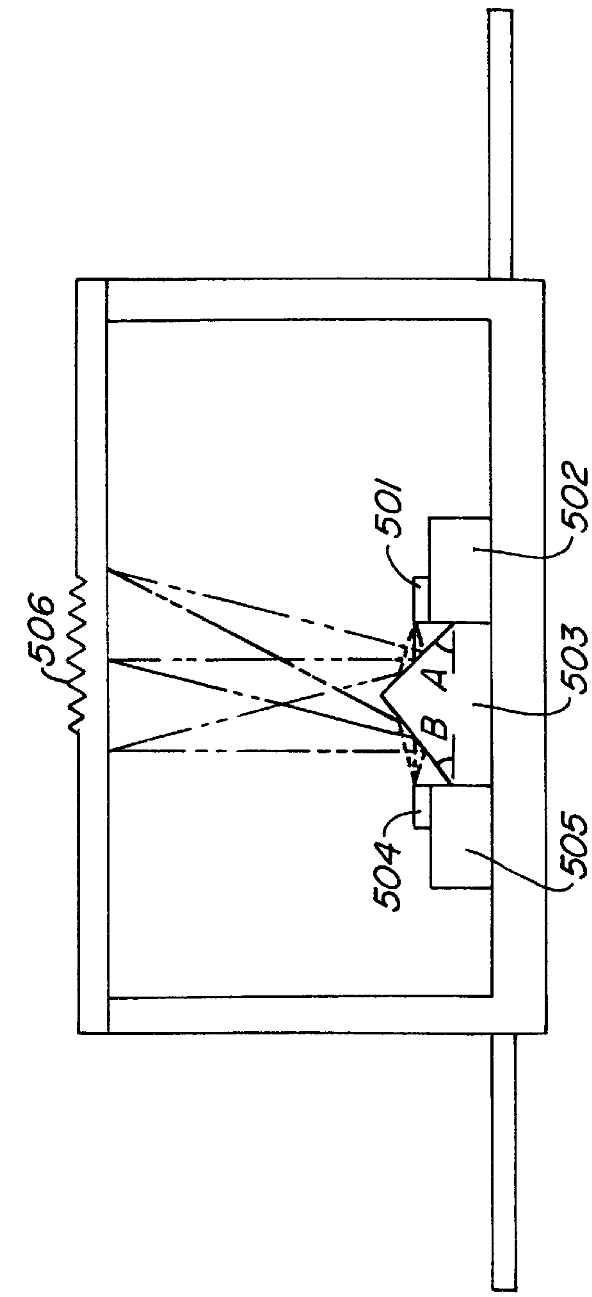
FIGS. 5 (A) and 5(B) are side and top views of a laser package and hologram combiner using a prism.
Figure 5B:
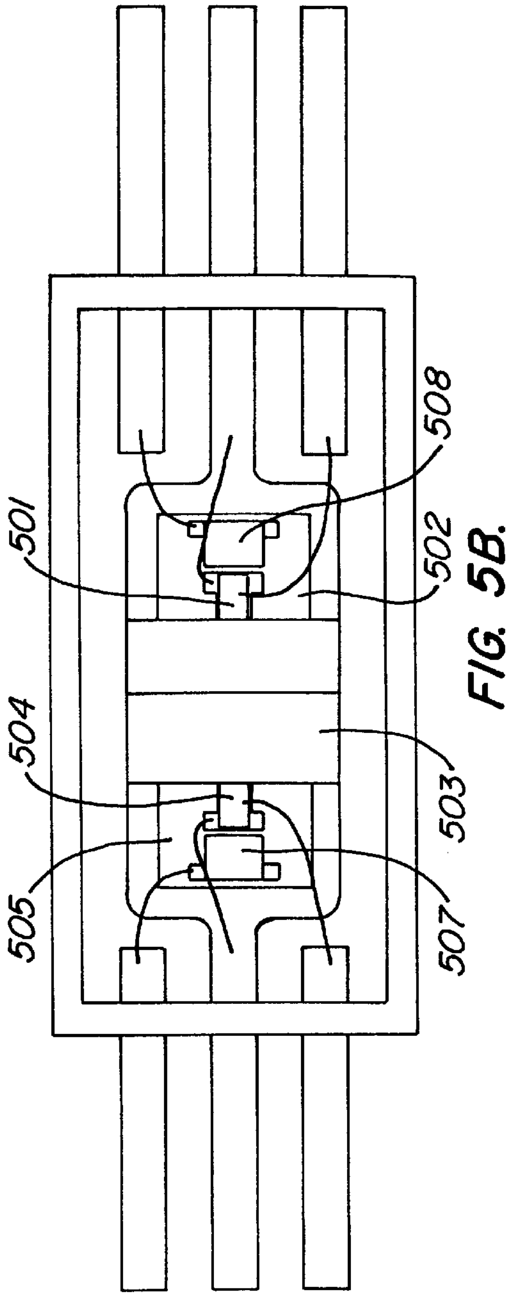

FIG. 5A shows a side view of an embodiment of the laser package with hologram combiner as described in FIG. 3. A 650 nm laser chip is mounted on a submmount 502. The light emitted by laser 501 is reflected off a rooftop prism 503 to be incident perpendicular to the hologram 506. The angle A of the prism is 45 degrees. A second laser 504 is mounted on submount 505. The light emitted by this second laser is also reflected off the prism 503, but is then incident at an angle on the hologram plane. In this embodiment, the angle B of the prism is 40 degrees. As a result, the angle of incidence of this second laser beam on the hologram plane is 10 degrees. FIG. 5B shows the top view of this package. The submounts 502 and 505 are silicon photodetectors. Detector elements 508 and 507 serve as the power monitors for lasers 501 and 504 respectively. The laser chips and the power monitors are connected to the leads of the package by bond wires. In this particular embodiment, the distance of the second laser chip to the hologram plane is about 5 mm. The distance between the second laser chip and the optical axis of the hologram is about 1 mm. Based on this configuration the hologram function needed to correct for the spherical aberration caused by the change in substrate from 0.6 mm to 1.2 mm is given by $$\Phi(x,y)=2\pi/\lambda(A_1x+A_2x^2+A_3y^2+A_4x^3+A_5xy^2+A_6x^4+A_7x^2y^2+A_8y^4)$$

where $A_1=0.197$, $A_2=-0.0788$, $A_3=-0.0819$, $A_4=-0.0029$, $A_5=0.0008855$, $A_6=-0.00165$, $A_7=-0.000749$, $A_8=-0.00165$ and $\lambda$ is equal to 785 nm. In this particular phase function the A1 term is used to redirect the second laser beam to propagate along the optical axis of the first laser beam. The A2 and A3 term correct for the astigmatism caused by the 10 degree incident angle. The A4 and A5 terms correct for the caused again by the 10 degree incident angle. The terms A6, A7 and A8 correct for the spherical aberration caused by the medium thickness change.

The amount of spherical aberration is dependent on the particular objective lens used. The coefficients in Φ(x,y) are obtained by tracing light rays through the optical system with the 1.2 mm substrate.

Figure 6A:
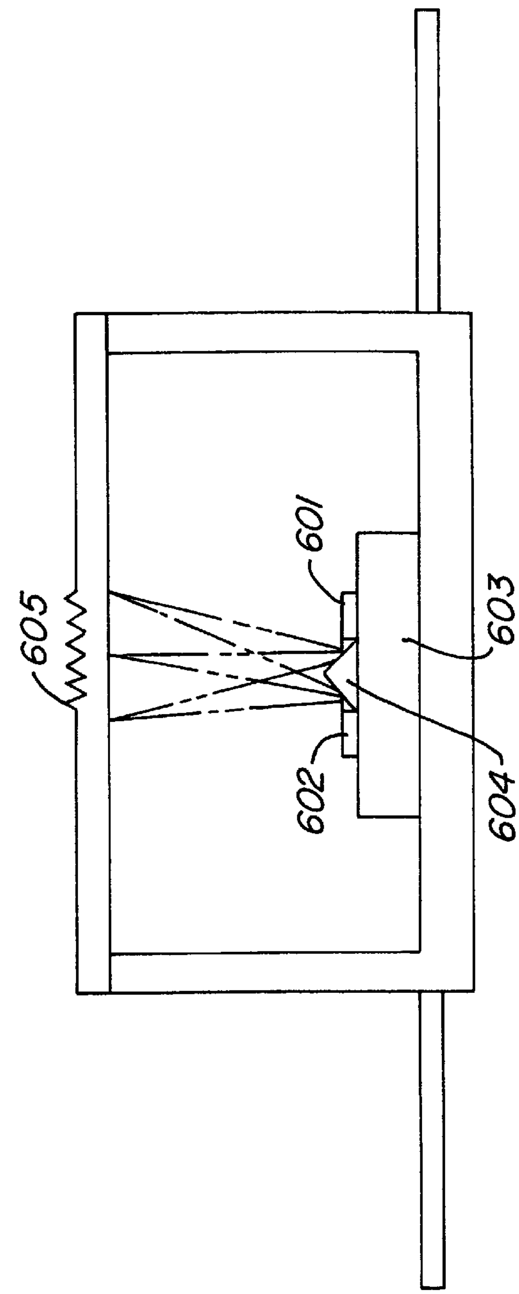
FIGS. 6 (A) and 5(B) are alternate side and top views of the laser package and hologram combiner of FIGS. 5 (A) and (B) modified to be mounted over a single detector.
Figure 6B:
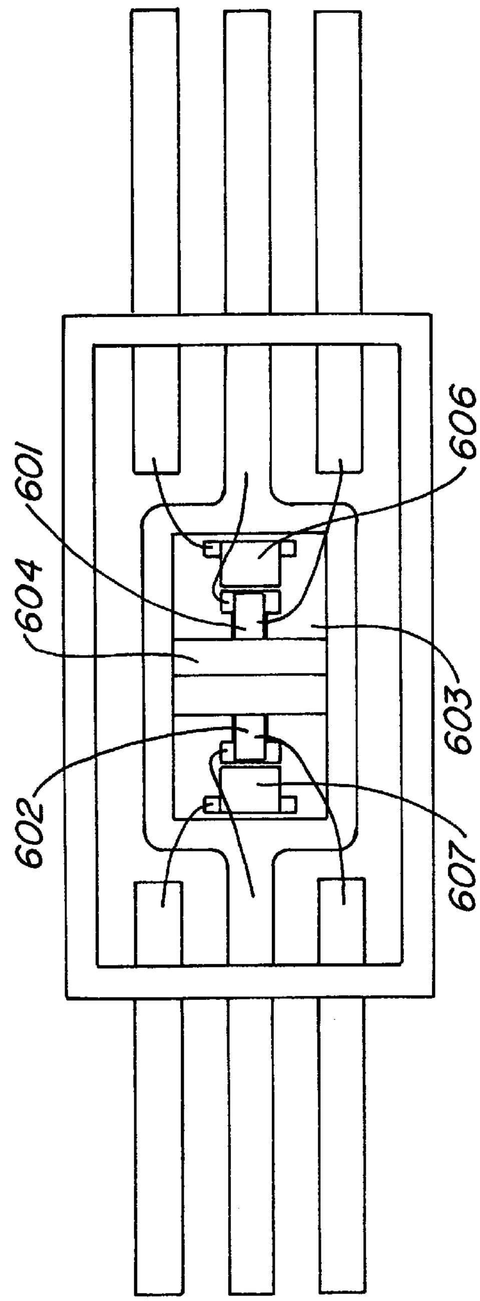

FIG. 6A shows another embodiment of the laser package. In this embodiment laser chips 601 and 602 and the rooftop prism 604 are mounted on the same silicon detector 603. FIG. 6B shows the power monitors 606 and 607 which are used to detect the back emissions from the laser chips 601 and 602. This embodiment uses a smaller rooftop prism and allows for a smaller package.

What is claimed is:

1. An optical pickup apparatus comprising:

a diffractive beam combiner;

a first laser source positioned along an optical axis of said diffractive beam combiner; and a second laser source positioned at an angle to said diffractive beam combiner corresponding to an anile between zero and 1st order diffracted beams, such that a 1st order diffracted beam from said second laser source is transmitted from a side of said diffractive beam combiner opposite said first and second laser sources along an optical axis of said diffractive beam combiner;

a lens positioned to focus beams from said diffractive beam combiner onto a medium.

2. The apparatus of claim 1 wherein said first laser source has a shorter wavelength than said second laser source.

3. The apparatus of claim 1, wherein said diffractive beam combiner is patterned in accordance with a phase function to at least partially correct for the aberration caused by said medium having different thicknesses.

4. The apparatus of claim 3 wherein said beam combiner is patterned to correct for said medium being thicker than said lens is optimized for.

5. The apparatus of claim 1 wherein said diffractive beam combiner comprises a hologram.

6. The apparatus of claim 1 further comprising:

a beamsplitter mounted between said diffractive beam combiner and said lens; and a multiple element photodetector mounted to receive light reflected off said medium through said beamsplitter.

7. The apparatus of claim 1 wherein each of said laser sources further comprises:

a laser emitting device;

a module for holding said laser emitting device;

a photodetector mounted in said module; and a hologram mounted in said module to diffract a reflected laser beam to said photodetector.

8. The apparatus of claim 1 further comprising:

a prism mounted between said first and second laser sources to redirect laser beams to said diffractive beam combiner.

9. The apparatus of claim 8 wherein said prism redirects said a first laser beam from said first laser source along optical axis of said diffractive beam combiner, and redirects a second laser beam from said second laser source at an angle to said diffractive beam combiner, such that a 1st order diffracted beam from said second laser source is generated by said diffractive beam combiner along an optical axis of said diffractive beam combiner.

10. The apparatus of claim 8 wherein said laser sources are mounted on submounts having a photodetector.

11. The apparatus of claim 8 wherein said laser sources and said prism are mounted on a single submount having at least one photodetector.

12. An optical pickup apparatus comprising:

a diffractive beam combiner;

a first laser source positioned along an optical axis of said diffractive beam combiner;

a second laser source positioned at an angle to said diffractive beam combiner corresponding to an angle between zero and 1st order diffracted beams, such that a 1st order diffracted beam from said second laser source is transmitted from a side of said diffractive beam combiner opposite said first and second laser sources along an optical axis of said diffractive beam combiner, wherein said first laser source has a shorter wavelength than said second laser source; and a lens positioned to focus beams from said diffractive beam combiner onto a medium;

wherein said diffractive beam combiner is patterned in accordance with a phase function to at least partially correct for the aberration caused by said medium having different thicknesses.

* * * * *